US00RE38312E

(19) United States
(12) Reissued Patent
Gamble

(10) Patent Number: US RE38,312 E
(45) Date of Reissued Patent: Nov. 11, 2003

(54) MICROPLATE ASSEMBLY AND CLOSURE

(75) Inventor: Kimberly R. Gamble, Suwanee, GA (US)

(73) Assignee: MicroLiter Analytical Supplies, Inc., Suwanee, GA (US)

(21) Appl. No.: 09/829,824

(22) Filed: Apr. 10, 2001

Related U.S. Patent Documents

Reissue of:
(64) Patent No.: 6,106,783
Issued: Aug. 22, 2000
Appl. No.: 09/108,339
Filed: Jun. 30, 1998

(51) Int. Cl.[7] ..... B01L 9/06
(52) U.S. Cl. ..... 422/102; 422/99; 422/100; 422/101
(58) Field of Search ..... 422/99, 100, 101, 422/102, 942, 948; 435/288.4, 305.2, 305.3, 305.4

(56) References Cited

U.S. PATENT DOCUMENTS 3,649,464 A * 3/1972 Freeman
4,496,657 A * 1/1985 Coppersmith et al. ... 435/283.1
4,557,393 A * 12/1985 Boik ..... 215/253
4,599,314 A * 7/1986 Shami
4,780,285 A * 10/1988 Kuypers et al. ..... 422/102
4,960,219 A * 10/1990 Jordan et al.
5,271,903 A * 12/1993 Durst et al. ..... 422/101
5,514,343 A * 5/1996 Verwohlt et al. ..... 422/104
5,683,659 A * 11/1997 Hovatter
5,707,589 A * 1/1998 Fullemann ..... 422/99
5,721,136 A * 2/1998 Finney et al.

OTHER PUBLICATIONS

Kimberly R. Gamble, MicroLiter Analytical Supplies, Inc., Suwanee, GA catalog distributed Jun., 1997.

* cited by examiner

*Primary Examiner*—Maureen M. Wallenhorst
(74) *Attorney, Agent, or Firm*—Kenneth S. Watkins, Jr.

(57) ABSTRACT

A microplate assembly with closure comprises a microplate base 101 having a geometric array of wells 103. Vials 113 of borosilicate glass inserted into the wells comprise flanges on the top portion of the vials. Closure 117 comprises an array of caps 119 having a complementary geometric pattern to the wells of the microplate base. The caps each comprises a septum and are connected by a thin membrane 121. Each cap comprises a sidewall 403 having a vial engagement ring which snaps over the flange 115 of the vials. Septum openings 135 in the caps extend through the top of the caps and provide a means to fill and evacuate the vials with a penetration device passing through the septa of the caps of the closure.

12 Claims, 6 Drawing Sheets

100
123D
117
125D
121
125A
135
123A
123C
125C
125B
123B
119
129D
131D
131A
129C
129A
131C
113
115
111
107
103
131B
109
105
101
129B

MICROPLATE ASSEMBLY AND CLOSURE

Matter enclosed in heavy brackets [ ] appears in the original patent but forms no part of this reissue specification; matter printed in italics indicates the additions made by reissue.

BACKGROUND OF THE INVENTION

The present invention relates to sample handling and storing assemblies and, more particularly, to microplate assemblies.

The growth in medical and pharmaceutical research as well as diagnostic analysis and testing has created a need for equipment and procedures for low cost, efficient handing of samples. Automated equipment is available for filling and retrieval of samples from sample containers.

Microplates comprising a plurality of sample wells have provided a convenient means to store samples. Automated equipment is available to position microplates for sample filling, retrieving, and analysis. Despite improvements in sample handling equipment, many applications require manual labor when performing evolutions such as preparing sample containers or vials, or covering or uncovering the samples. This is especially the case when sample numbers are insufficient to justify design and building of custom automated equipment.

Normally the wells of microplates are used as the sample containers. One of the problems arising from this technique is cross contamination of samples due to the base of sample migration across the top surface of the microplate. Also, the use of adhesive web closures to cover multiple wells further increases cross contamination between wells. Due to the high cost of making microplates of glass, use of plastics has become common. These units suffer the additional problem of contamination of samples due to the fact that most plastics are less inert to sample solvents than glass.

OBJECTS AND SUMMARY OF THE INVENTION

Therefore and object of the present invention is to provide a microplate assembly with a closure which can be quickly and easily applied to a plurality of the sample containers of the microplate.

Another object of the present invention is to provide a microplate assembly with closure which reduces cross contamination of samples.

A further object of the present invention is to provide a microplate assembly with closure which improves chemical inertness as compared to using wells of plastic microplates.

Yet another object of the present invention is to provide a microplate assembly with closure which is low in cost, rugged and reliable.

The microplate assembly with closure of the present invention comprises a microplate base having a plurality of wells arranged in a geometric pattern. Glass vials having the quality of good chemical inertness are insertable into the wells of the microplate base. Caps, preferably integral with a flexible or semi-rigid membrane and in the geometric pattern of the microplate base wells, are placed over the vials. The caps comprise a sidewall. The inner diameter of the sidewall engages an outside surface of the glass vials. The caps have a septum opening and septum comprising a resealable portion and a barrier portion. The septum allows insertion of a probe such as a hypodermic needle for filling and retrieving samples while the caps are engaged on the vials. A vial seal of chemically inert material prevents contact of the sample and the septum seal.

In the preferred embodiment, a standard 96 well microplate base is utilized. Vials are made of borosilicate glass for inertness and long life. The vials have an outer diameter selected to make them insertable into the wells of the microplate base. The vials may be flanged, plain or serum finish. The closure comprises 96 caps arranged in the same geometric pattern as the wells of the microplate base. The caps are integrally formed with a membrane connecting the caps. The caps fit over the outer diameter of the vials and comprise a vial or flange engagement ring to retain the cap on the vial.

The microplate closure allows rapid capping or uncapping of a full complement of vials in the microplate simultaneously. In other embodiments, cap strips cover one or more rows or columns of vials. In yet another embodiment, single septum caps are utilized.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a microplate assembly with closure that provides for sealing and sampling a plurality of sample vials in the microplate.

Figure 1:
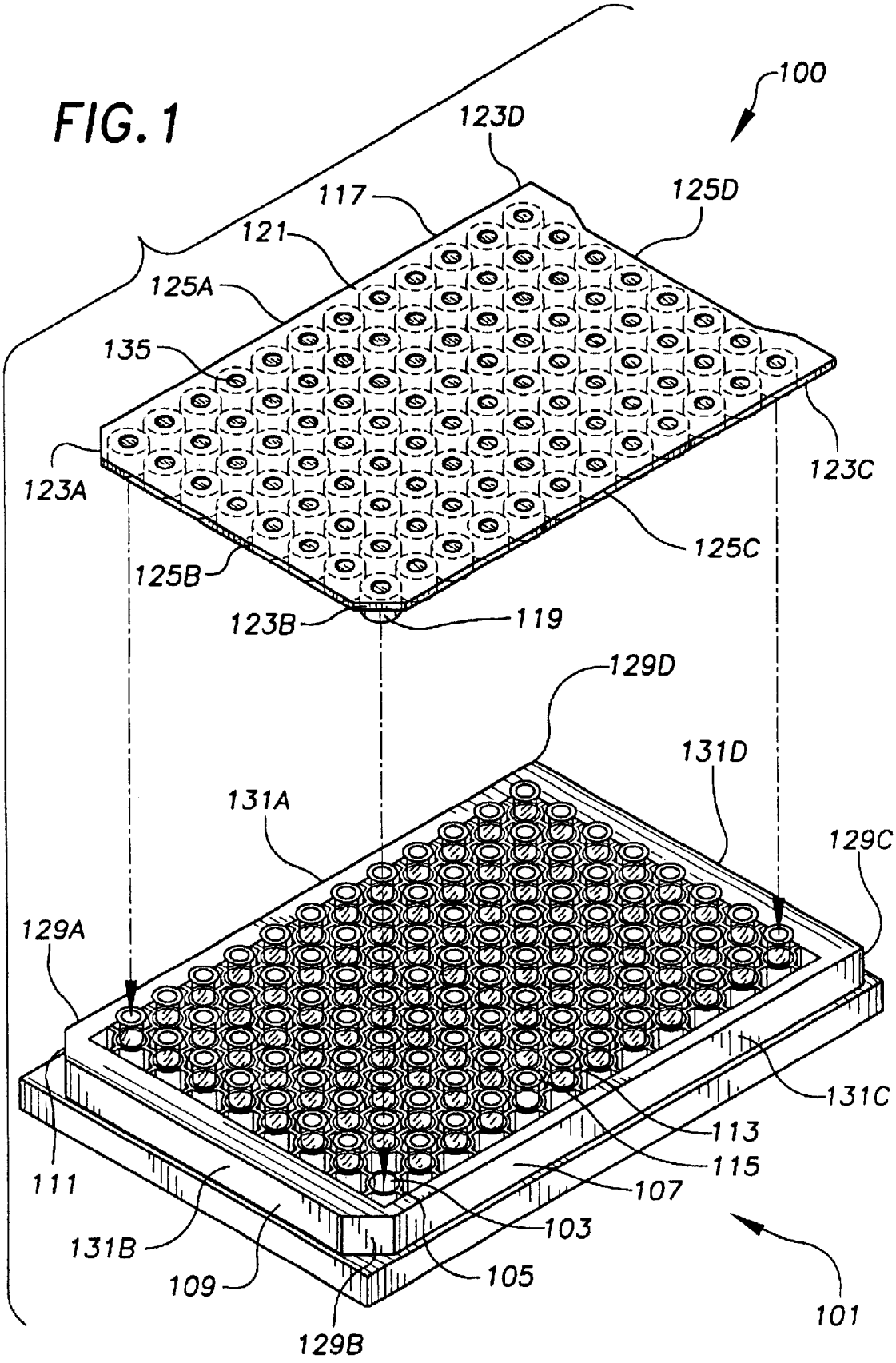
FIG. 1 is a perspective drawings of an embodiment of a microplate and closure assembly comprising a 96 well microplate, flanged vials, and a closure comprising 96 integral septum caps attached to a membrane.

FIG. 1 is a perspective drawing of embodiment 100 of the microplate assembly with closure. Microplate 101 comprises a plurality of wells 103 arranged in a geometric pattern. In the preferred embodiment, the geometric pattern is a rectangular array eight wells in width and 12 wells in length. In the preferred embodiment, wells 103 are 6.2 millimeters in diameter (nominal dimensions) and the spacing of wells 103 in the length and width directions is 9 millimeters. In other embodiments, microplates of different numbers of wells or geometric patterns of wells are used. In the preferred embodiment, microplate 101 is made of a plastic material such as polyethylene or polypropylene. In other embodiments, microplate 101 is made of metal, composites, or glass. Microplate 101 may be machined, die cast or injection molded. Microplate 101 may comprise ribs 105 which support wells 103 from longitudinal wall 107 and transverse wall 109 and from other wells. Chamfers 111 may be used to index or align the microplate for closure and for automatic sampling equipment (not shown). Microplates may be of either shallow well, as shown, or deep well as known in the art.

Wells 103 act as receptors for vials 113. In the preferred embodiment, vials 113 are made of glass such as borosilicate glass and comprise a flange 115. Glass vials provide a vial material which is inert to most sample materials. In the preferred embodiment, the diameter of vials 113 provide a loose fit in wells 103, providing easy removal and replacement of vials 113. In other embodiments, the outer diameter of vials 113 provide a snug or slight interference fit with wells 103.

Closure 117 comprises a plurality of caps 119 attached to membrane 121. Caps 119 are arranged in a geometric pattern similar to the geometric pattern of wells 103. In the preferred embodiment, caps 119 form a rectangular array 8 caps wide by 12 caps in length. The similar geometric pattern of caps 119 and wells 103 provides alignment of caps 119 to vials 113 placed in wells 103. When respective corners 123A–D or edges 125A–D, of closure 117 are aligned to respective corners 129A–D and edges 131A–D of microplate 101, caps 119 are aligned with vials 113 placed in wells 103.

In the preferred embodiment, caps 119 fit over flanges 115 of vials 113. Pressing of closure 117 on vials 113 inserted in wells 103 engages caps 119 and respective vials 113, sealing vials 113. Hand or mechanical applicator pressure may be used to provide closure 117 engagement to vials 113. Septum openings 135 provide access for insertion of injection needles.

Figure 2:
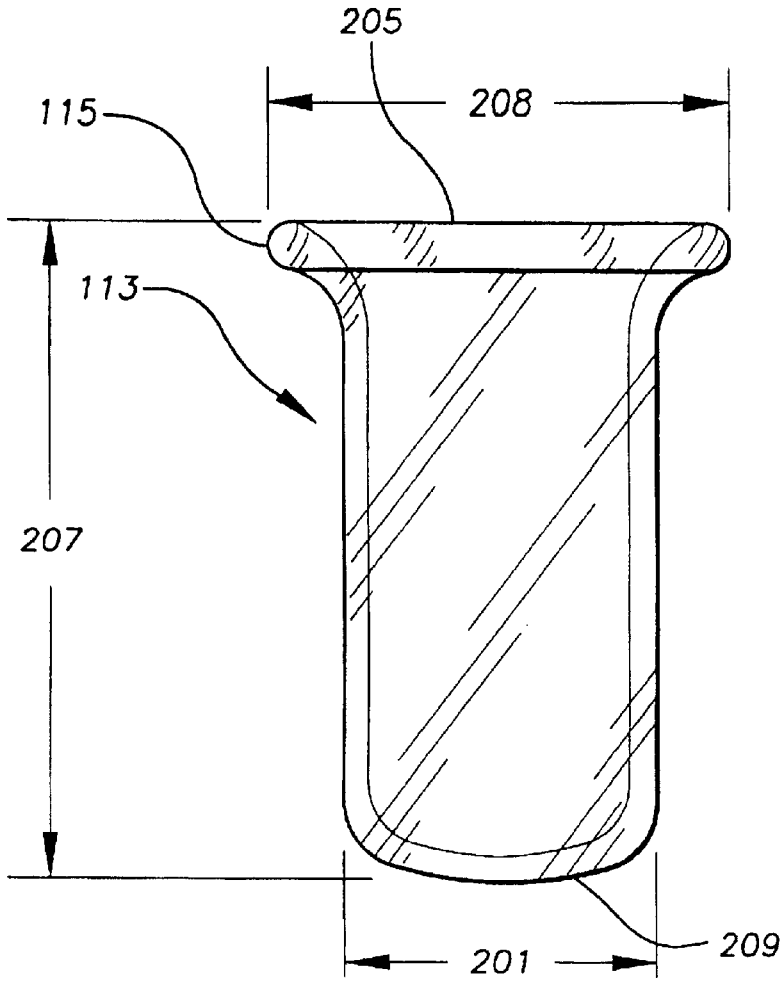
FIG. 2 is a side elevation drawing of a flanged vial of the assembly of FIG. 1.

FIG. 2 is a side elevation of vial 113 of FIG. 1. In the preferred embodiment, vial 113 outer diameter 201 is 6.0 mm (nominal), allowing a loose fit with standard 96 well microplates having well inner diameter of 6.2 mm (nominal). Vial length 207 is typically 15±2 mm. In deep well microplates, vial length may be longer, for example 41±2 mm. Vial 113 comprises a flange 115 located at opening 205. Flange 115 outer diameter 208 is 7.75 mm (nominal). In the preferred embodiment, vial bottom 209 is generally flat. In other embodiments, vial bottom 209 is cylindrical or tapered.

Figure 3:
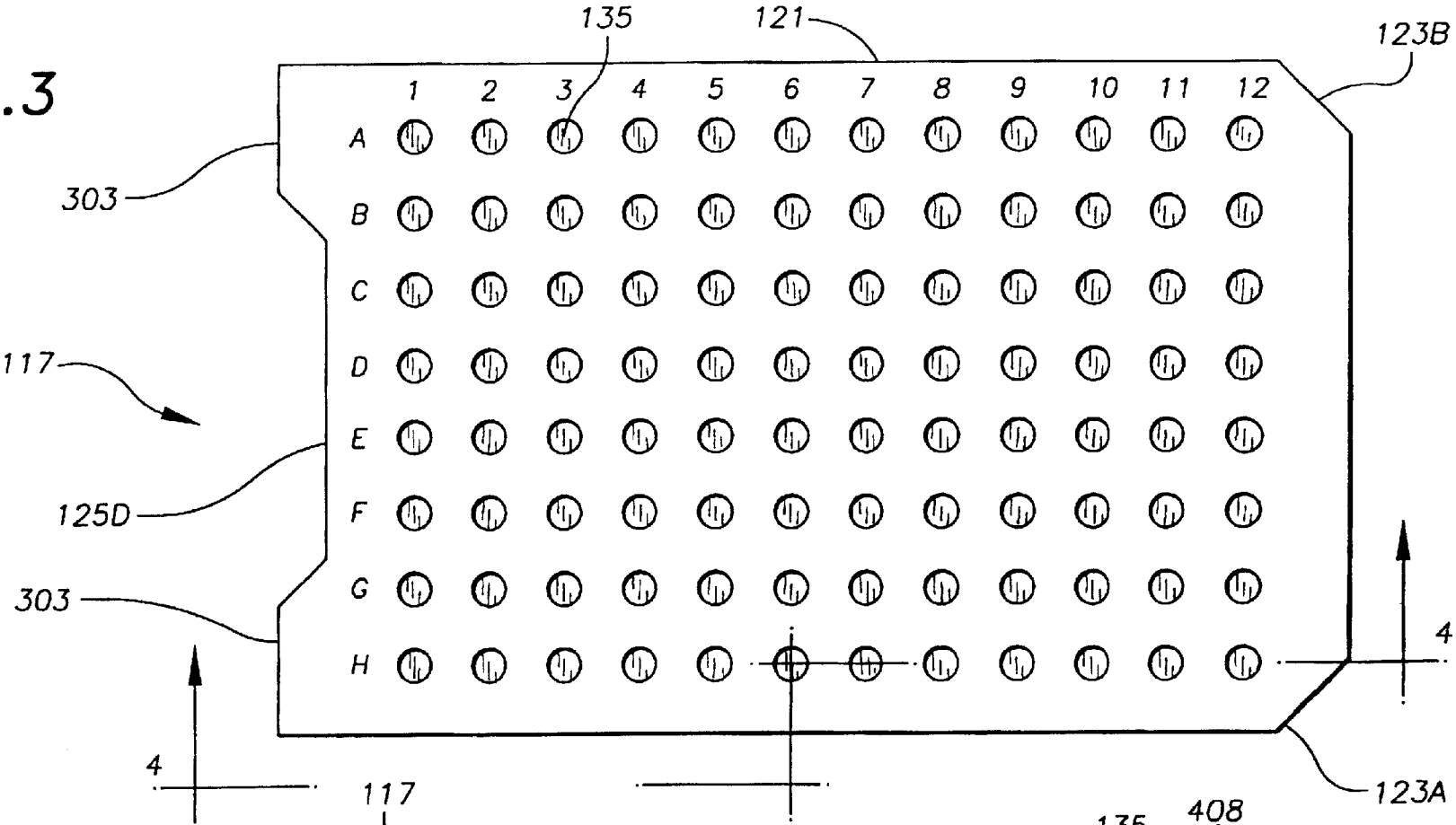
FIG. 3 is a top view of the closure of FIG. 1 showing septum openings, alignment chamfers, and grip flap portions.

FIG. 3 is a top view of closure 117 showing an 8×12 array of septum openings 135 in membrane 121. In the preferred embodiment, membrane 121 is made from a flexible polymeric material such as polyolefins. In other embodiments, membrane 121 is made of vinyl, natural or synthetic rubbers, or other elastomers. In the preferred embodiment, closure 117 is injection molded of polyethylene, resulting in caps (119 of FIG. 1) integral with membrane 121. Flap portions 303 project along edge 125D of closure 117, providing a surface which is easily engaged with the fingers of the hand to remove and replace closure 117 on vials 113. In other embodiments, flap portions or extended edge portions are provided on other edges of closure 117. Corners 123A and 123B may be chamfered as shown to aid in alignment of closure 117 to microplate 101 of FIG. 1. Chamfered corners also act as alignment means for storage and handling of groups of closures. In other embodiments, closure 117 is made of rigid polymeric material.

Figure 4:
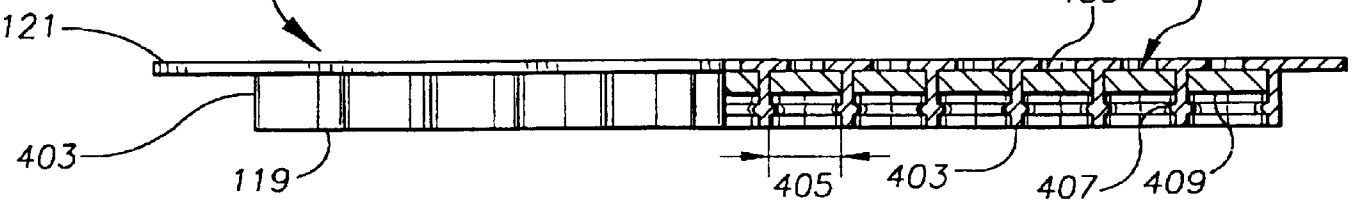
FIG. 4 is a side elevation and partial cutaway drawing taken along lines 4—4 of FIG. 3.

FIG. 4 is a side view and partial cross section of closure 117 taken at lines 4—4 of FIG. 3. Caps 119 comprise sidewall portion 403. Sidewall portion 403 is generally cylindrical and has an inner diameter 405 sufficient to fit over vials 113 of FIG. 1. In the preferred embodiment, the inner diameter of caps 119 comprise a flange engagement ring 407 protruding inside sidewall 403 for engaging flanges 115 of vials 113 to retain caps 119 on vials 113. Septum 408 comprising resealable portion 409 provides a seal between septum opening 135 and the vial (not shown).

Figures 5A, 5B, 5C:
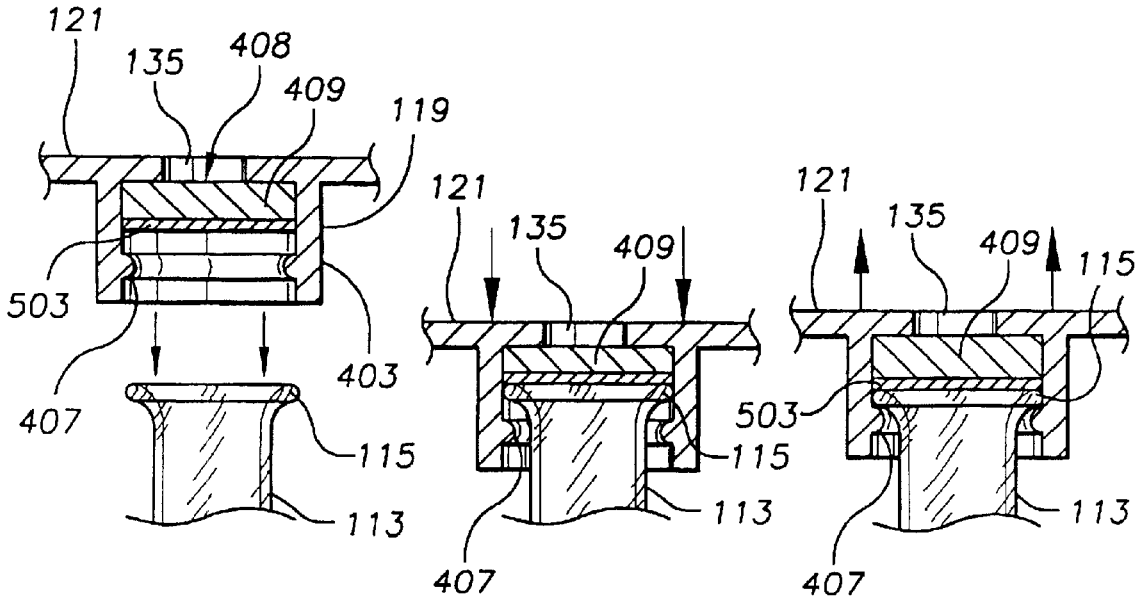
FIG. 5A is a detail of the flanged vial and a cutaway of a cap of the closure of FIG. 1 before the cap is inserted on the vial.
FIG. 5B is a detail of the flanged vial and a cutaway of a cap of the closure of FIG. 1 when the cap is fully inserted on the vial with the flange of the vial compressing the septum seal of the cap.
FIG. 5C is a detail of the flanged vial and a cutaway of a cap of the closure of FIG. 1 with the flange engagement ring of the cap engaging and retained by the flange of the vial.

FIG. 5A is a detail cross section of cap 119 about to be engaged with vial 113. Septum resealable portion 409 of septum 408 provides a seal between septum opening 135 and vial 113. In this manner, a transfer device such as a hypodermic needle (not shown) may be inserted into septum opening 135 of membrane 121 and penetrate septum resealable portion 409 to fill or evacuate vial 113 with cap 119 engaged to vial 113. Septum resealable portion 409 may be a self sealing compound such as soft butyl rubber. In other embodiments, septum resealable portion 409 is made of silicone, other elastomers or polymer materials. In still other embodiments, septum 408 may comprise a thin portion (not shown) of membrane 121 extending over septum opening 135.

In the preferred embodiment, a barrier portion 503 disposed between septum resealable portion 409 and vial 113 provides a chemically resistant barrier seal for contents of vial 113. In the preferred embodiment, barrier portion 503 is made of polytetrafluoroethylene (PTFE). In other embodiments, other polymers or metallic seals may be used.

FIG. 5B is a detail cross section of cap 119 inserted over vial 113 so that flange 115 of vial 113 is inserted past engagement ring 407. In the preferred embodiment, flange engagement ring 407 is made of a resilient material which deforms as flange 115 of vial 113 passes over flange engagement ring 407. Septum resealable portion 409 compresses as cap 119 is inserted over flange 115 of vial 113, allowing flange engagement ring 407 to expand after flange engagement ring 407 clears flange 115. After cap 119 is released, septum resealable portion 409 expands to seat flange 115 against flange engagement ring 407 and barrier portion 503 seats the opening of vial 113 as shown in FIG. 5C.

Figure 6:
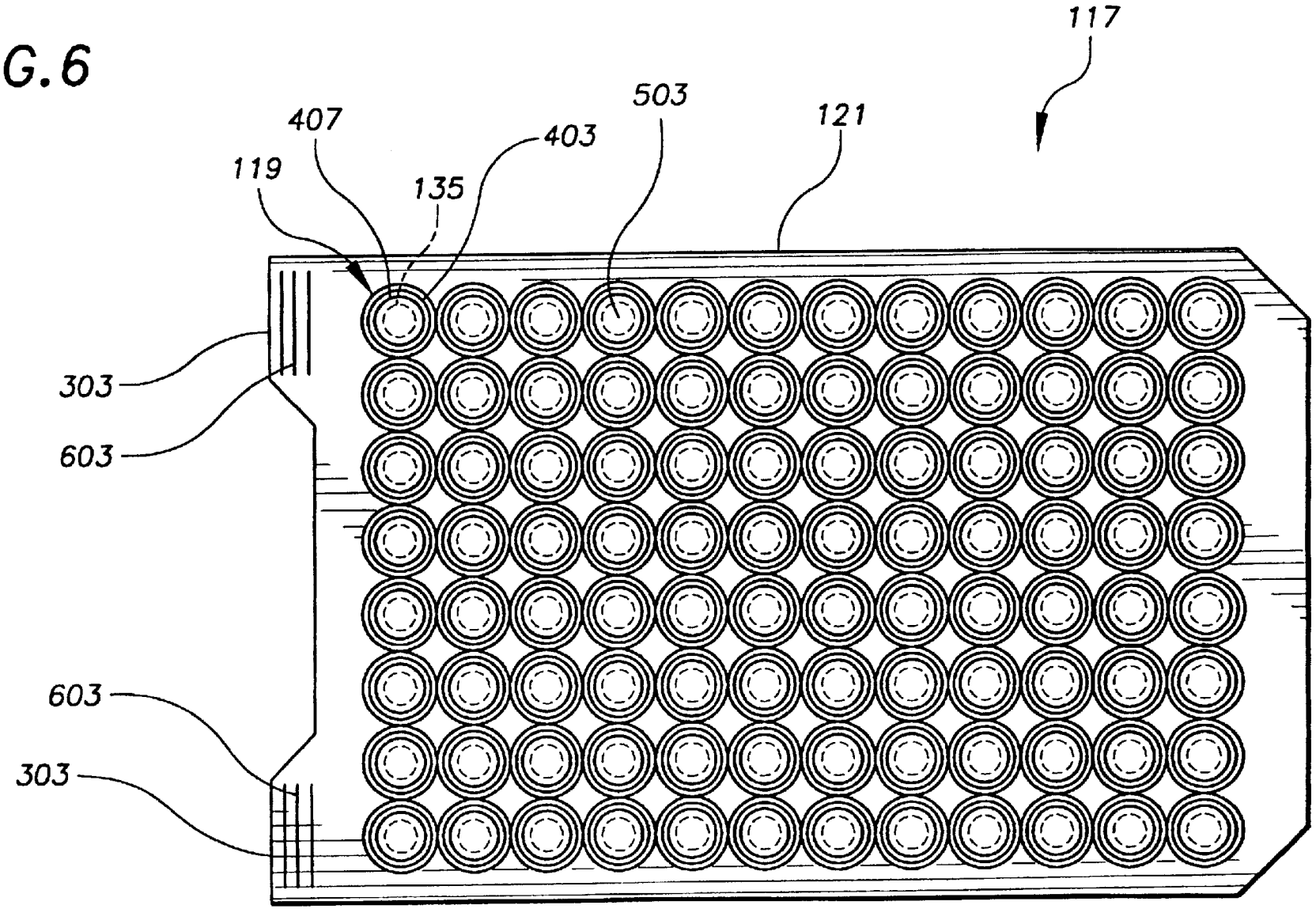
FIG. 6 is a bottom view of the closure of FIG. 1 showing caps, membrane, flange engagement ring, flap portion and grip ribs, with the septum openings shown in phantom lines.

FIG. 6 is a bottom view of closure 117 showing caps 119 attached to membrane 121. Flange engagement ring 407 is attached to the inner diameter of sidewall 403. Barrier portion 503 and septum resealable portion 409 (not shown) cover septum opening 135. Grip ribs 603 of flap portions 303 provide a grip surface to improve removal of closure 117 from microplate and vial assemblies.

Figure 7:
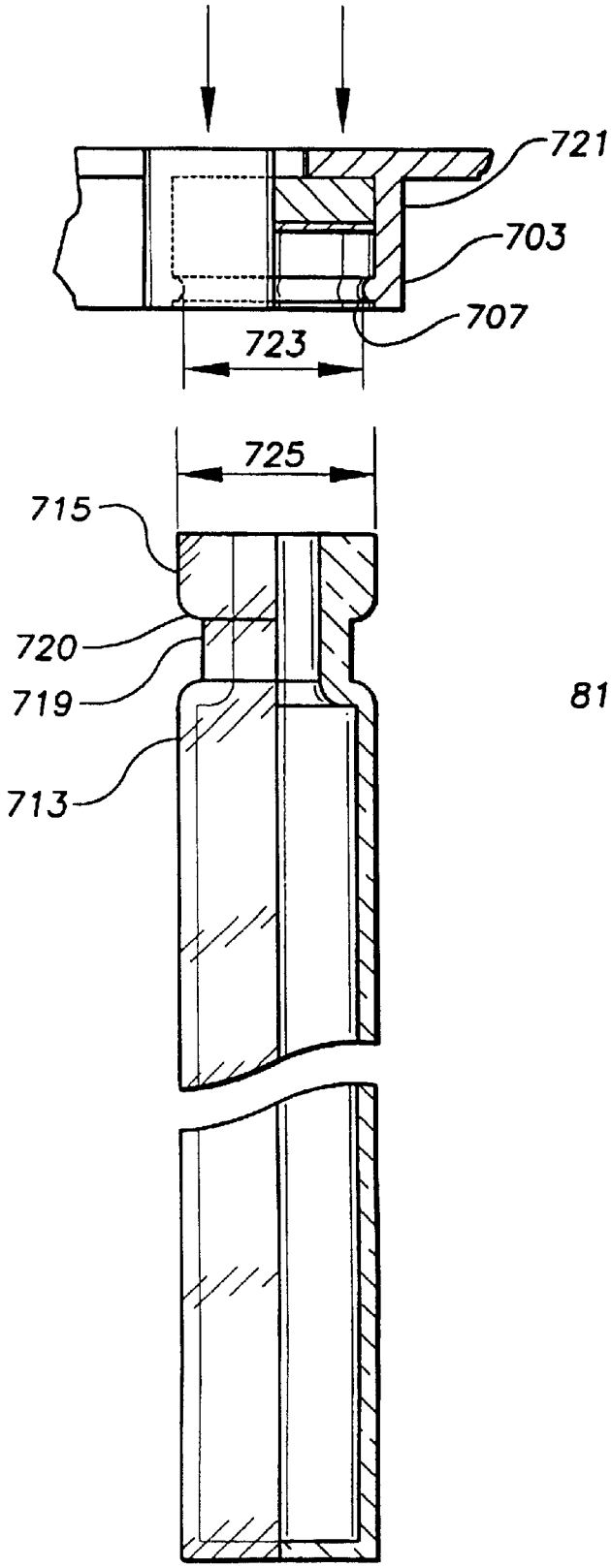
FIG. 7 is a side elevation and partial cutaway of a serum finish vial and cap of a closure the cap comprising a flange engagement ring for engaging the ledge of the flange.

FIG. 7 is a partial cutaway drawing of an embodiment of a vial and closure utilizing an 8 mm serum finish vial 713. Crimp flange 715 provides a mount surface for a standard 8 mm crimp cap (not shown). Crimp recess 719 provides a ledge 720 on crimp flange 715 for the crimping portion of the crimp cap to grip. Serum finish vials may be used in square well or round well microplates.

Flange engagement ring 707 of cap 721 engages ledge 720 when cap 721 is pressed onto vial 713. The inner diameter 723 of flange engagement ring 707 is less than the outer diameter 725 of flange 715. Use of a resilient material for sidewall 703 of cap 721 and flange engagement ring 707 provides an expansion and contraction means of flange engagement ring 707, allowing cap 721 to be pressed on vial 713. Once flange engagement ring 707 is advanced to crimp recess 719, flange engagement ring 707 expands inwardly and engages ledge 720 of flange 715. Removal of cap 721 requires pulling of the cap sufficiently to expand flange engagement ring over flange 715.

Figure 8:
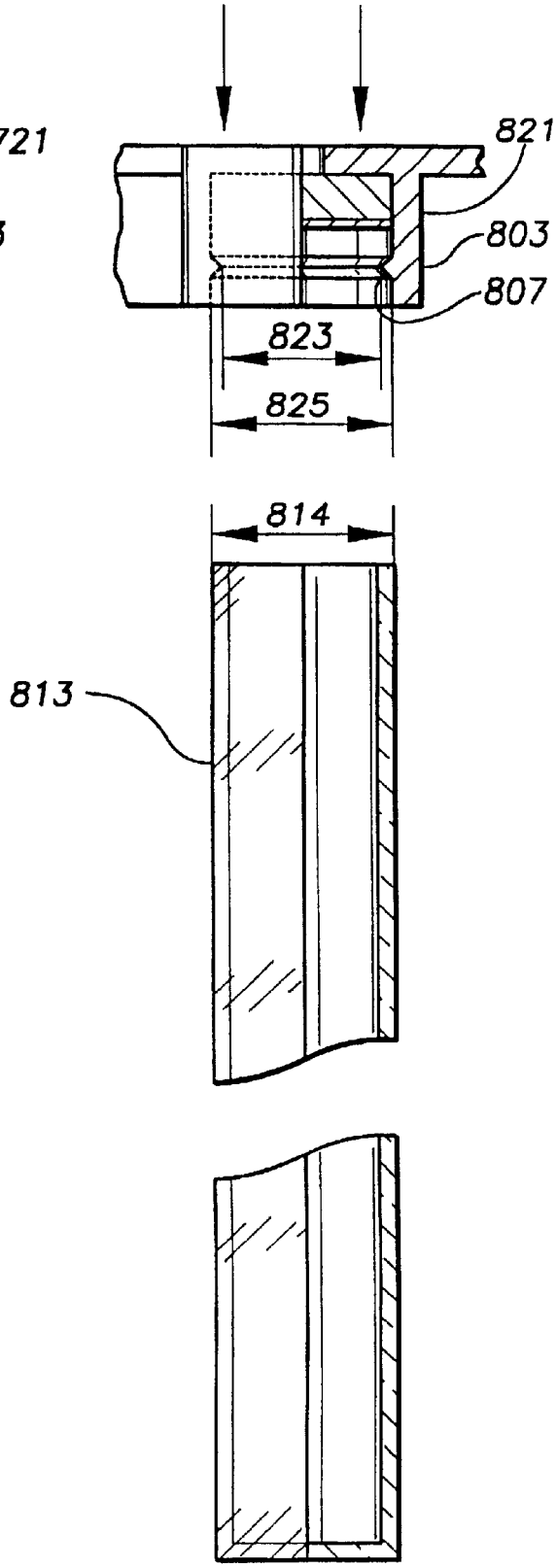
FIG. 8 is a side elevation and partial cutaway of a flangeless vial and cap of a closure, the cap comprising a seal ring for engaging the outer diameter of the vial.

FIG. 8 is a partial cutaway drawing of another embodiment of vial and closure utilizing a flangeless vial 813. In this embodiment, the inner diameter 823 of seal ring 807 is less than the outer diameter 814 of vial 813. When pressed over vial 813, seal ring 807 forms a tight fit with the outer diameter of vial 813, sealing cap 821 and vial 813. In other embodiments, seal ring 807 may have rectangular, semicircular, or trapezoidal cross sectional shapes. Or, several seal rings may be used. In still other embodiments, seal ring 807 is omitted, and the inner diameter 825 of cap 821 is less than outer diameter 814 of vial 813. The resulting tight fit of sidewall 803 to the outer diameter 814 of vial 813 seals cap 821 to vial 813. Resilient materials such as polyolefins for cap 821 allow adequate sealing with moderate (0.1 mm–0.5 mm) interference fits.

Figure 9:
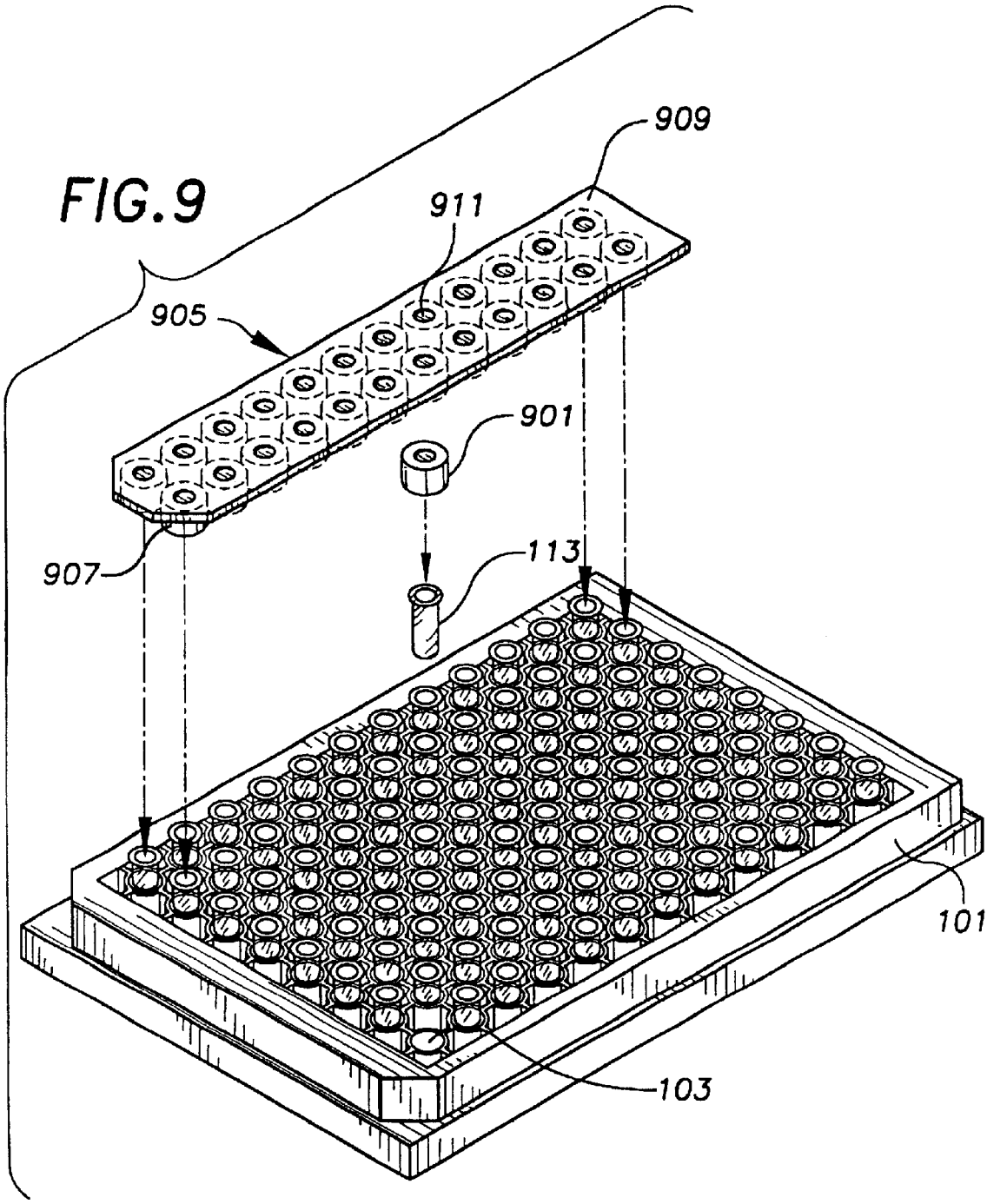
FIG. 9 is a perspective drawing of individual caps and cap strips for sealing single vials or strips of vials in a microplate.
Figure 9A:
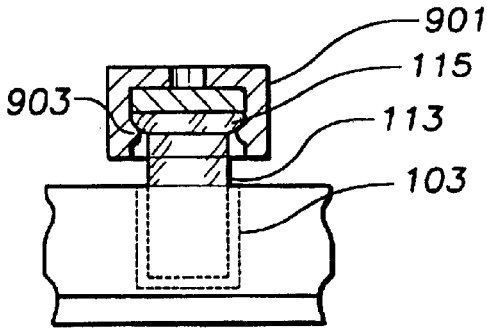
FIG. 9A is detail cut-away drawing of a cap snapped over a flange of a vial.

FIG. 9 is a perspective drawing of microplate 101 comprising 96 wells 103. Individual septum caps 901 are snapped on flanged vials 113 and inserted into wells 103. FIG. 9A is a detail cutaway drawing of cap 901 snapped over flange 115 of vial 113. Flange engagement ring 903 of cap 901 engages flange 115 to retain cap 901 on vial 113. In the preferred embodiment, vial 113 is a loose fit in well 103. In other embodiments, vial 113 forms a snug fit in well 103.

Cap strip 905 comprises 16 integral caps 907 on membrane 909, similar to those of FIGS. 1–6. Caps 907 may comprises septum openings 911. In other embodiments, cap strip 905 comprises one or more partial or full rows or columns of vial caps. Cap strip 905 allows a separate use of only a portion of the vials and wells of microplate 101.

Accordingly the reader will see that the MICROPLATE ASSEMBLY AND CLOSURE provides fast closure and access to of a plurality of vials inserted into the wells of a microplate base. The device provides the following additional advantages:

The samples are housed in chemically inert vials;

Septa in the caps provide for filling and removal of samples while the caps are inserted on the vials;

Closure strips provide caps for selected rows or columns of vials; and

The device is simple and low in cost.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A microplate assembly with closure comprising:

a microplate base comprising a plurality of sample containable wells arranged in a geometric pattern;

a plurality of glass vials comprising dimensions providing a predetermined fit in said plurality of sample containable wells in the microplate base, each of said plurality of glass vials comprising a vial opening, a flange, and a closed vial bottom *and*;

a closure comprising a plurality of caps attached to a membrane, said plurality of caps arranged in the geometric pattern of said plurality of sample containable wells in the microplate base, each of said plurality of caps comprising a bottom cap opening, a top septum opening, a sidewall engageable to an outside surface of said each of said plurality of glass vials, the sidewall of each of said plurality of caps comprising a [vial] *flange* engagement ring on an inside surface of said sidewall for engaging the flange of each of said plurality of glass vials, *said flange engagement ring protruding inside of said sidewall,* and a septum between the top septum opening and the bottom cap opening.

2. The microplate assembly with closure of claim 1 wherein the microplate base is a 96 well base arranged in a twelve by eight array on nine millimeter centers.

3. The microplate assembly with closure of claim 1 wherein said plurality of glass vials are made of borosilicate glass.

4. A closure for a plurality of glass vials dimensioned for insertion into a plurality of sample containable wells of a microplate *arranged in a geometrical pattern*, the closure comprising:

a plurality of caps attached to a membrane, said plurality of caps arranged in the geometric pattern of said plurality of sample containable wells;

each of said plurality of caps comprising a cylindrically shaped sidewall, the sidewall comprising a bottom cap opening and comprising a [vial] *flange* engagement ring [on the] *protruding inside an* inner diameter of the sidewall, the [vial] *flange* engagement ring comprising a ring inner diameter sufficient to fit over and engage an outer diameter of *a flange of* each of said plurality of glass vials[,]*;* a top septum opening, and a septum between the bottom cap opening and the top septum *opening*.

5. The closure of claim 4 wherein the sidewall of said each of said plurality of caps comprises a flange engagement ring on the inner diameter of the sidewall for engaging a flange on said each of said plurality of glass vials.

6. The closure of claim 4 wherein the septum of each of said plurality of caps comprises a resealable portion for sealing the top septum opening and a barrier portion for sealing the resealable portion from each of said plurality of vials.

7. The closure of claim 6 wherein the barrier portion is PTFE.

8. The closure of claim 6 wherein the resealable portion comprises silicone.

[9. A microplate assembly with closure comprising:

a microplate base comprising a plurality of sample containable wells arranged in a geometric pattern;

at least one glass vial of dimensions providing a predetermined fit in said plurality of sample containable wells in the microplate base, said at least one glass vial comprising a vial top opening, a vial top flange comprising a top sealing surface, and a closed vial bottom; and at least one snap cap insertable onto said at least one glass vial, said at least one snap cap comprising a top, a sidewall comprising a flange engagement element, and a septum comprising an upper resealable portion and a lower barrier portion, the septum disposed between the top and the flange engagement element;

whereby the barrier portion seals the top sealing surface of the glass vial when the flange engagement element engages the vial flange.]

[10. The microplate assembly with closure of claim 9 wherein the microplate base is a 96 well base arranged in a twelve by eight array on nine millimeter centers.]

[11. The microplate assembly with closure of claim 9 wherein said at least one glass vial is made of borosilicate glass.]

[12. A sample vial and cap assembly for insertion in a sample containable well of a microplate base, the sample vial and cap assembly comprising:

a glass vial of dimensions providing a predetermined fit in said sample containable well in the microplate base, the glass vial comprising a vial top opening, a vial top flange comprising a top sealing surface, and a closed vial bottom; and a snap cap insertable onto said glass vial, the snap cap comprising a top, a sidewall comprising a flange engagement element, and a septum comprising an upper resealable portion and a lower barrier portion, the septum disposed between the top and the flange engagement element;

whereby the barrier portion seals the top sealing surface of the glass vial when the flange engagement element engages the vial flange.]

[13. The sample vial and cap assembly of claim 12 wherein the flange engagement element is disposed on the sidewall wherein the resealable portion of the septum is compressed to seal the barrier portion of the septum to the top sealing surface of the top flange of the vial when the flange engagement element is engaged to the top flange of the vial.]

[14. The sample vial and cap assembly of claim 13 wherein the flange engagement element is a flange engagement ring disposed on an inside surface of the sidewall and the flange engagement ring is made of a resilient material.]

*15. The microplate assembly with closure of claim 1 wherein the closure comprises an alignment element for providing alignment to said microplate base.*

*16. The microplate assembly with closure of claim 15 wherein the alignment element is a chamfer on a corner of the closure.*

*17. The closure of claim 4 wherein the closure comprises an alignment element for providing alignment to a microplate.*

*18. The microplate assembly with closure of claim 17 wherein the alignment element is a chamfer on a corner of the closure.*

* * * * *